United States Patent Office 2,882,284
Patented Apr. 14, 1959

2,882,284

STEROID INTERMEDIATES

Gerald D. Laubach, Jackson Heights, N.Y., assignor to Chas. Pfizer & Co., Inc., New York, N.Y., a corporation of Delaware No Drawing. Application January 11, 1955
Serial No. 481,275

6 Claims. (Cl. 260—397.47)

This invention is concerned with certain novel steroid compounds which are useful as intermediates. This application is a continuation-in-part of application Serial Number 474,977, filed December 13, 1954, by Gerald D. Laubach, and now abandoned. That application was a continuation-in-part of parent application Serial Number 463,805, filed October 21, 1954, and now abandoned. Another continuation-in-part of this parent application was filed on January 7, 1955, and has issued as U.S. Patent 2,708,651. In this last mentioned application, there is described the use of these compounds as intermediates for the synthesis of central nervous system depressants.

These compounds are those having the formula

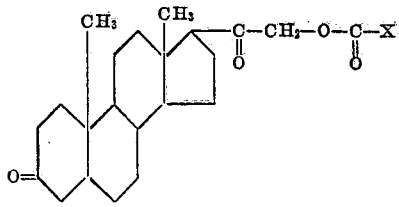

in which X is chosen from the group consisting of Cl, —O—CH$_2$—CH$_2$—Cl, —NH—CH$_2$—CH$_2$—Cl —CH$_2$—Cl, and —CH$_2$CH$_2$—COOH. This generic formula includes both compounds of the pregnane series, that is, compounds having the formula

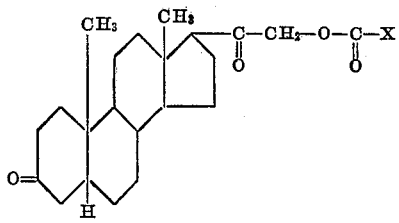

and also compounds of the allopregnane series, that is, compounds having the formula

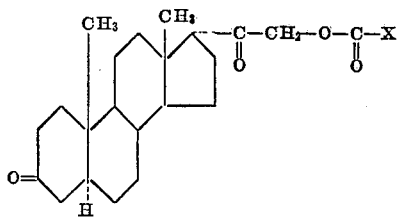

The compounds of this invention are prepared by reactions at the 21-position hydroxyl group of either 21-hydroxy-pregnane-3,20-dione, or 21-hydroxy-allopregnane-3,20-dione. The reagents used are phosgene, β-chloroethyl chloroformate, β-chloroethylisocyanate, chloroacetyl chloride and succinic anhydride. The following examples illustrate the use of each of these reagents.

EXAMPLE I

Reaction with phosgene

A solution of one gram of 21-hydroxy-pregnane-3,20-dione in 5 ml. of benzene was added dropwise to a cooled, stirred solution of 0.5 gram of phosgene in 5 ml. of benzene containing one ml. of pyridine. The solution was stirred two hours at 25° C. and evaporated to dryness in vacuo. The residue was 21-hydroxy-pregnane-3,20-dione chloroformate. The equation for this reaction is as follows:

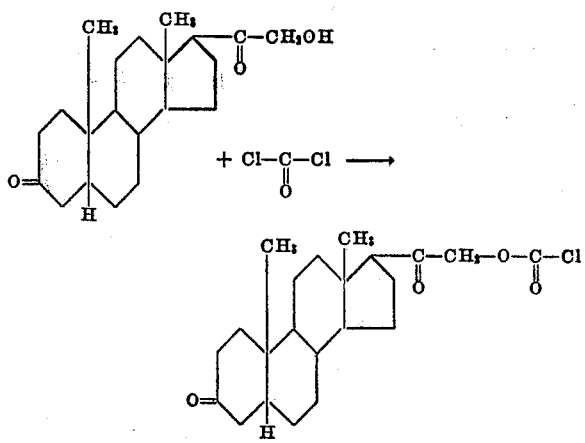

EXAMPLE II

Reaction with β-chloroethyl chloroformate

One half gram of β-chloroethyl chloroformate was added to a stirred, cooled solution of one gram of 21-hydroxy-pregnane-3,20-dione in 5 ml. of pyridine and the solution allowed to stand 24 hours. It was then stirred into 20 ml. of ice cold 3 N sulfuric acid and extracted three times with 15 ml. of chloroform. After washing with 1 N sulfuric acid, water and sodium bicarbonate solution, the chloroform extract was dried over anhydrous sodium sulfate and evaporated to dryness in vacuo. Trituration of the residue with ether yielded the crystalline 21-hydroxy-pregnane-3,20-dione β-chloroethyl carbonate. The equation for this reaction is as follows:

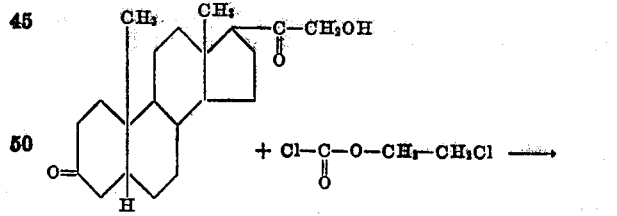

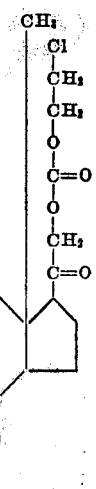

EXAMPLE III

*Reaction with β-chloroethylisocyanate*

One gram of 21-hydroxy-pregnane-3,20-dione was dissolved in 5 ml. of dimethylformamide and treated with 0.6 gram of β-chloroethylisocyanate. After standing 18 hours, the mixture was poured into water and the precipitated product filtered off and washed with water. The product was 21-hydroxy-pregnane-3,20-dione β-chloroethylcarbamate. The equation for this reaction is as follows:

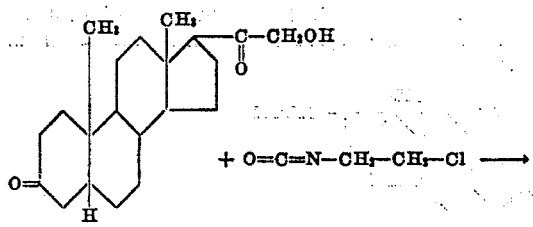

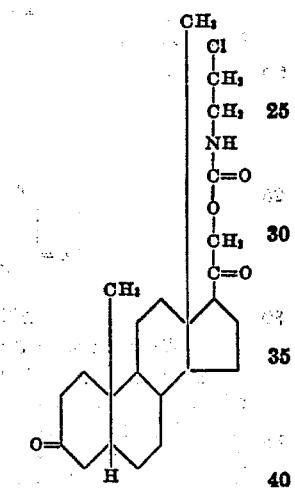

EXAMPLE IV

*Reaction with chloroacetyl chloride*

To a solution of 21-hydroxy-pregnane-3,20-dione in pyridine was added two molar equivalents of chloroacetyl chloride. After 12 hours, the product, 21-hydroxy-pregnane-3,20-dione chloroacetate, was isolated by precipitation with a large volume of dilute, acidified ice water. The equation for this reaction is as follows:

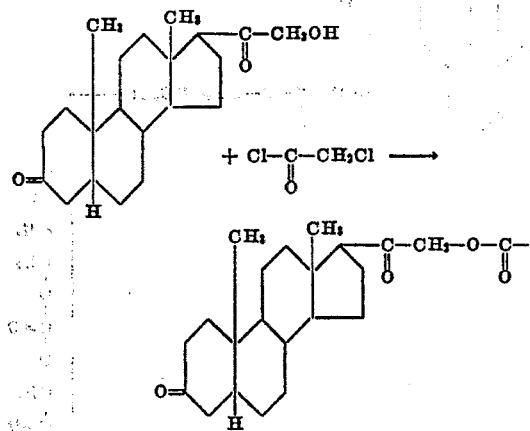

EXAMPLE V

*Reaction with succinic anhydride*

A solution of 14 grams of 21-hydroxy-pregnane-3,20-dione and of 14 grams of recrystallized succinic anhydride in 140 ml. of dry pyridine was allowed to stand at room temperature for 18 hours, then cooled in an ice bath and poured in a fine stream into 1.5 l. of ice water. Excess pyridine was neutralized with 3 N hydrochloric acid and the solution further diluted with 2 l. of ice water. The precipitated product was filtered, washed with water and dried in vacuo at 50° C. The product was identified as 21-hydroxy-pregnane-3,20-dione-hemisuccinate.

EXAMPLE VI

*Preparation of allo compounds*

Examples 1 to 5 inclusive were repeated with no change except the use of 21-hydroxy-allopregnane-3,20-dione in place of 21-hydroxy-pregnane-3,20-dione. In each case, the reaction proceeded in identical fashion and the corresponding allo compound was obtained.

The foregoing examples are given solely for the purpose of illustration, and are not to be considered as limitations of this invention, many variations of which are possible without departing from the spirit or scope thereof.

What is claimed is:

1. A compound having the formula

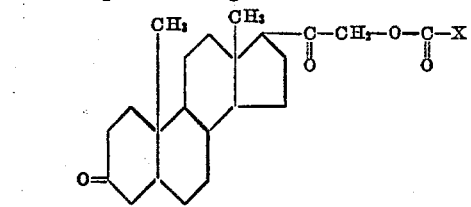

wherein X is chosen from the group consisting of Cl,
—O—CH$_2$—CH$_2$—Cl, —NH—CH$_2$—CH$_2$—Cl
—CH$_2$—Cl and —CH$_2$—CH$_2$—COOH.

2. A compound having the formula

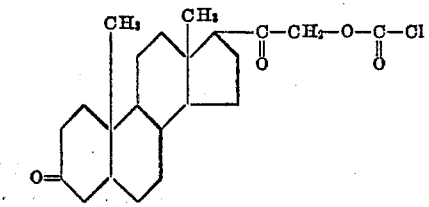

3. A compound having the formula

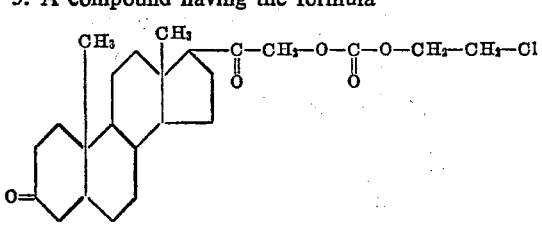

4. A compound having the formula

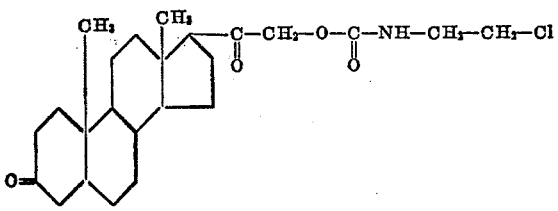

5. A compound having the formula

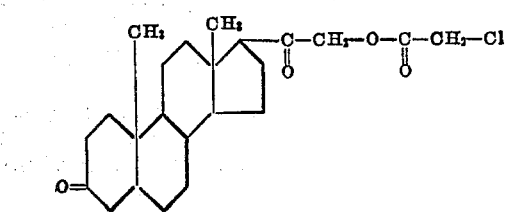

6. A compound having the formula
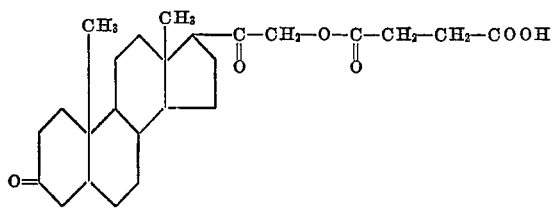
References Cited in the file of this patent
UNITED STATES PATENTS
| | | |
|---|---|---|
| 2,183,589 | Reichstein | Dec. 19, 1939 |
| 2,312,483 | Reichstein | Mar. 2, 1943 |
| 2,708,651 | Laubach | May 17, 1955 |